United States Patent

[11] 3,600,527

| [72] | Inventor | William H. Blashfield |
| | | Galion, Ohio |
| [21] | Appl. No. | 882,455 |
| [22] | Filed | Dec. 5, 1969 |
| [45] | Patented | Aug. 17, 1971 |
| [73] | Assignee | North Electric Company |
| | | Galion, Ohio |

[54] DIAL SPEED TESTER
12 Claims, 2 Drawing Figs.

[52] U.S. Cl. .................................................. 179/175.2
A, 328/140
[51] Int. Cl. ..................................................... H04m 1/24
[50] Field of Search ............................................ 179/175.2
A; 324/140 D; 328/140

[56] References Cited
UNITED STATES PATENTS

| 3,123,679 | 3/1964 | Donville et al. | 179/175.2 A |
| 3,410,967 | 11/1968 | Boring | 179/175.2 A |
| 3,502,904 | 3/1970 | Bordonaro | 328/140 |
| 3,529,247 | 9/1970 | Nelson | 328/140 |

Primary Examiner—Kathleen H. Claffy
Assistant Examiner—Douglas W. Olms
Attorney—Johnson, Dienner, Emrich, Verbeck and Wagner ABSTRACT: A circuit arrangement for testing the speed of telephone dials wherein the number of dial pulses from the telephone dial is represented by the voltage on a capacitor which can be read by a direct current meter with a linear scale.

INVENTOR
WILLIAM H. BLASHFIELD

INVENTOR
WILLIAM H. BLASHFIELD

DIAL SPEED TESTER

BACKGROUND OF THE INVENTION

1. Field of Invention

The invention relates to telephone test equipment for dial devices on telephone instruments.

2. Description of the Prior Art

Telephone dials as now used in the field generate pulses at a typical rate of 10 pulses per second. The testing of a dial device to determine the precise rate of the dial has in the past, however, proved difficult since only a limited number of pulses are provided in a single operation of the dial, i.e., typically 10 pulses in each dial operation. In addition, the output information resulting from processing of the pulses frequently exists for too short a period to permit accurate and reliable readout on known meter equipment.

Retention of the reading on a meter is achieved in certain prior art systems by adding a "prebias" current which hold the meter at a reading of 10 pps until the dial pulses arrive. If the dial speed is 11 pps, for example, the meter will then only have to move from the 10 pps reading to 11 pps instead of from 0 to 11. In an alternate mode of operation, the prebias is made manually adjustable. In such mode, if in the first dial test the meter is observed to move from 10 pps to 11 pps during dialing, the prebias is reset to 11 pps, and in a subsequent test, the meter should hold steady.

Both the described methods have the fault that the meter reading falls off when the pulses stop and accurate readout is difficult. In overcoming such fault a counter circuit may be added to restore the prebias current after 10 pulses. Then, if the prebias current has been set correctly, the meter should not move either during or after the pulses. Such equipment requires considerable skill on the part of the user, and the user becomes proficient only after repeated exposure.

SUMMARY OF THE INVENTION

It is an object of the present invention to provide a readout meter device which presents a readout of the pulse frequency of a unit under test within the period in which 10 pulses are received, and which further maintains such reading after pulsing is terminated. Such arrangement is achieved without the use of adjustable prebias current and a counter circuit such as is used in presently known devices.

It is a further object of the invention to provide a testing apparatus for telephone dials in which contact bounce and make break ratio of the dialing relay will have no effect upon the reading of the meter.

The novel apparatus for providing such improved mode of pulse testing includes switching means which are operative to mark associated storage means in the absence of a pulse, and to clear the storage means over a discharge circuit which includes a feedback circuit of an operational amplifier responsive to receipt of each pulse. The feedback circuit for the operational amplifier extends over two branch circuits, one of which includes a capacitor, and the other of which includes a peak and hold circuit connected across such capacitor. The steady current provided through the two branch circuits is equal to the average current which appears at the input of the operational amplifier. The output voltage of the peak and hold circuit is proportional to the frequency of incoming pulses within a certain range of frequencies.

During the period of receipt of the make period of each input pulse, the capacitor in the one branch circuit discharges, and during the break period, the capacitor recharges. The value of such capacitor is chosen so that the capacitor in the feedback circuit, after the first few pulses of a series, consistently recharges to the potential which is representative of the pulse frequency.

The potential output of the peak and hold circuit which is determined by the potential on such capacitor after several pulses of a series, is read by a direct current meter in terms of frequency, and the pointer is held steady for at least ten seconds by the peak and hold circuit, whereby readout of the information is precisely and readily obtained.

DESCRIPTION OF THE PREFERRED EMBODIMENTS

The dial speed tester of the present invention in a typical installation might be located at a test or wire chief's desk. In one mode of operation, connections would be made from the dial speed tester at the desk to a subscriber substation by dialing the subscriber's directory number through a special test train in the central office equipment. A service man at the subscriber's premises (or the subscriber himself) is requested to dial a '0,' and the wire chief will observe the dial speed as determined by the dial speed tester in response to the 10 incoming impulses transmitted by the dial.

In another mode of operation, a service man at the subscriber's premise dials a special number to reach the equipment at the wire chief desk, and after the connection is made, dials a '0' so that the wire chief may observe the test results on the dial speed tester.

In yet another mode of operation, the service man at the subscriber's premise dials a special number to connect to the equipment at the wire chief desk to indicate that a test is in order. The wire chief thereupon plugs into the line to be tested at the main frame, and the service man dials a '0.' It is of course apparent that in addition to such uses in the field, the dial speed tester can also be used locally on a test bench.

Figure 1:
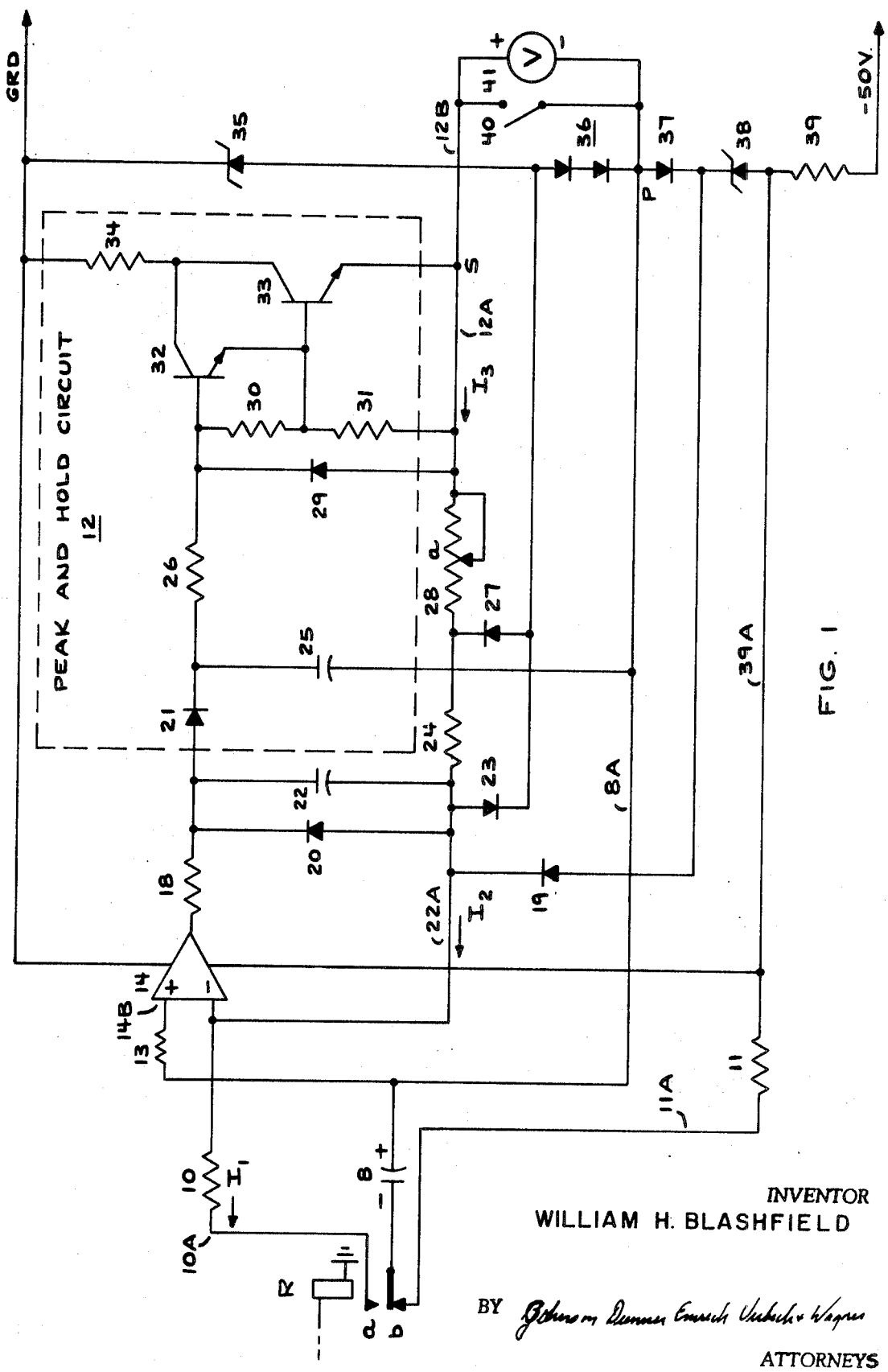
FIG. 1 is a schematic diagram of the novel tester circuit.

Referring to FIG. 1, there is shown thereat a relay R which is operated by the input pulses (such as the pulses of a digit 0 dialed by the service man at the subscriber's premises) received over the exchange switching system (not shown). A first contact $b$ on relay R is normally closed (i.e., in the absence of a pulse input to relay R) to complete a charging circuit for capacitor 8 which is connected across Zener diode 38 and diode 37 which are in turn connected in a series circuit which includes resistor 39, Zener diode 38, diode 37, voltage reference point P, diode 36 and Zener diode 35 connected between −50v. and ground. Capacitor 8 which is connected across Zener diode 38 and diode 37 charges to the breakdown voltage of Zener diode 38 and diode 37 via path 39A, resistor 11, path 11A, contact "$b$" of dialing relay R, capacitor 8, and path 8A to potential reference point P in the described series circuit.

With the application of a dial pulse to relay R, contacts "$b$" are opened, and contacts "$a$" are closed to connect capacitor 8 over conductor 10A, resistor 10 and lead 14A to the negative input of an operational amplifier 14, and also over conductor 22A, capacitor 22 and resistor 18 to the output of operational amplifier 14 to establish a discharge circuit for capacitor 8, as will be described.

The output of the operational amplifier 14 is connected over a resistance 18 and a feedback circuit having a first branch which includes capacitor 22, and a second branch which extends over diode 21, resistances 26, transistors 32, 33 in the peak and hold circuit 12, lead 12A and resistors 28a, 24. The two branches are connected common over conductor 22A to input 14A.

The output circuit of peak and hold circuit 12 is further connected over lead 12B and a DC meter 41 to the potential reference point P.

The peak and hold circuit 12 essentially consists of a diode 21 and resistance 26 which connects the output of operational amplifier 14 to the input for series connected transistors 32, 33. Storage capacitor 25 is connected from the junction of resistor 18 and diode 21 to potential reference point P. Resistors 30, 31 are connected in series between the transistor input circuit and potential reference point S, the resistance 30 being connected across the base emitter circuit of transistor 32, and the transistor 31 being connected across the base emitter circuit of transistor 33.

Diode 19 connected between the feedback circuit for operational amplifier 14 and the junction of diodes 37, 38 guards the amplifier 14 against any foreign negative input voltage. Diode 23 connected between the feedback circuit and the junction of diodes 35, 36 protects the operational amplifier 14 against any foreign positive input voltage, such as ground. Diode 27 in combination with diodes 36 holds the input to amplifier 14 slightly positive to create negative output when the meter is reset. Diode 37 connected in the described series circuit provides temperature compensation for Zener diode 38, and resistor 26 which connects the output of amplifier 14 to the transistors 32, 33 provides protection against excessive discharge current from capacitor 25 when reset contact 40 is closed. Resistor 34 connected in the collector circuit for transistors 32 and 33 provides protection for the transistors, and diode 29 connected across transistors 32, 33 protects against application of foreign ground to the output of amplifier 14.

OPERATION

It should be initially noted that an operational amplifier which has one input connected to a reference potential and a second input connected to a variable signal source and also to a feedback circuit will automatically adjust its output so that via the feedback circuit, the differential voltage at the two inputs is maintained substantially at zero difference, whereby substantially no current will be conducted over the operational amplifier. That is, the gain of the amplifier is extremely high (as for example 100,000) and even the smallest change at the inverting input (14A) causes the operational amplifier 14 to provide an output which as applied over the feedback circuit adjusts the voltage at the inverting input 14A back to essentially the same value as the voltage at the reference input 14B.

In the novel circuit shown in FIG. 1, prior to the receipt of the first pulse, relay R is restored, contact $b$ is closed, and capacitor 8 will charge to a value approximately equal to the breakdown voltage of Zener diode 38. As a pulse is received over the input circuit, relay R operates and closes contact "a" to connect the charged capacitor 8 to a discharge circuit which extends from the capacitor 8 over contact 8, conductor 10A, resistor 10 to the inverter input 14A of the operational amplifier 14 and over conductor 22A, capacitor 22 and resistor 18 to the output stage of the operational amplifier 14. With the flow of current $I_1$ in the discharge path for capacitor 8, the voltage at the input terminal 14a for operational amplifier 14 drops and operational amplifier 14 immediately operates to change the voltage at its output by an amount sufficient to maintain a zero voltage difference between the inverter and reference inputs 14a, 14b of the operational amplifier 14.

Current $I_1$ which flows over resistance 10 in the discharge path is made up of current which flows from the output of the amplifier over the resistance 18 and capacitor 22, conductor 22A, resistor 10, conductor 10A, and contact $a$, and reverse current which flows in the second branch which includes diode 21, resistance 26, transistors 32, 33, and resistors 28a, 24 and capacitor 22, whereby the current flow over capacitor 22 is $I_2-I_3$. During the current flow in the discharge path the operational amplifier operates in known manner to continually adjust the voltage at its output by a value necessary to maintain the voltage at inverter input 14a for the operational amplifier at zero difference relative to the voltage at reference input 14b, and the voltage on capacitor 22 increases by an amount related to the capacitance of capacitor 8.

As the pulses of a dial under test are received, each time contacts $b$ are closed capacitor 8 charges, and each time contracts $a$ are closed capacitor 8 discharges. During the first discharge of capacitor 8 the current flow over capacitor 22 causes the voltage on capacitor 22 to increase by a value $V_j$ (see the first vertical line $V_j$ in FIG. 2). The voltage on capacitor 25 increases in a like manner with the voltage on capacitor 22, and by reason of the connection of capacitor over transistors 32, 33 (which are connected as emitter followers) and path 12b, the voltage is applied to meter 41. The emitter followers 32, 33 are provided in order to prevent any significant drainage of potential from capacitor 25.

As the break period of the next pulse is received, contacts $a$ are opened, and the voltage $E_o$ at junction S (the voltage which appears on meter 41 as a result of the potential charge on capacitor 25) causes a current flow over resistors 28a and 24 which tends to change the voltage at the inverter input 14A at the operational amplifier 14. As noted above, the operational amplifier thereupon operates in an attempt to maintain a zero difference between inputs 14A and 14B, and the output of operational amplifier goes negative to establish a current flow over capacitor 22 in a reverse direction to cause the output voltage of the operational amplifier 14 to drop, and thereby maintain zero differential voltage at the inputs 14A, 14B for the operational amplifier.

As the operational amplifier operates in such manner to drop the voltage at its output, the charge on capacitor 22 is decreased at a rate determined by the current flow over resistance 28a, 24 (which in turn determines the slope of $VC_2$) but capacitor 25 remains at the value $VO_1$. As will be shown, the slope of the discharge increases as successive pulses of the series are received because the potential charge on capacitor 25 (and therefore the potential at point S) has increased as successive pulses were received. Such change in slope continues until the average current flow over capacitor 22 is zero, after which time the voltage on capacitors 22, 25 returns to the same peak value as each successive pulse is received.

It is now assumed, for the purpose of illustration, that an '0' is dialed on a telephone dial under test, which if in working order, will produce ten pulses per second. Upon the arrival of the first pulse, the dialing relay closes its contact '$a$' and opens '$b$.' With the closing of '$a$,' capacitor 8 discharges as described above, and the operational amplifier 14 operates to produce a peaked current pulse at the output of amplifier 14 which through resistor 18 charges capacitor 22 and capacitor 25. If capacitor 8 is charged to $V_1$ volts, and resistance 10 ($R_1$) is extremely small, the voltage on capacitor 22 will increase by an amount $V_j=(V_1C_1/C_2)$, where $C_1$ and $C_2$ are the capacities of capacitances 8 and 22 respectively. Capacitor 8 has a value which permits complete discharge during the time that contact '$b$' is open and the discharge path is closed over contact '$a$.'

As the break period following the make period of the first pulse is received, relay R restores and contact '$b$' closes. The potential $E_0$ at point S, as a result of the charge retained on capacitor 25, results in current flow through capacitor 22 which causes its voltage to decrease in a linear manner to $VC_2$, the slope of the falling voltage being determined by the current flowing through capacitor 22 and its capacitance ($C_2$).

Figure 2:
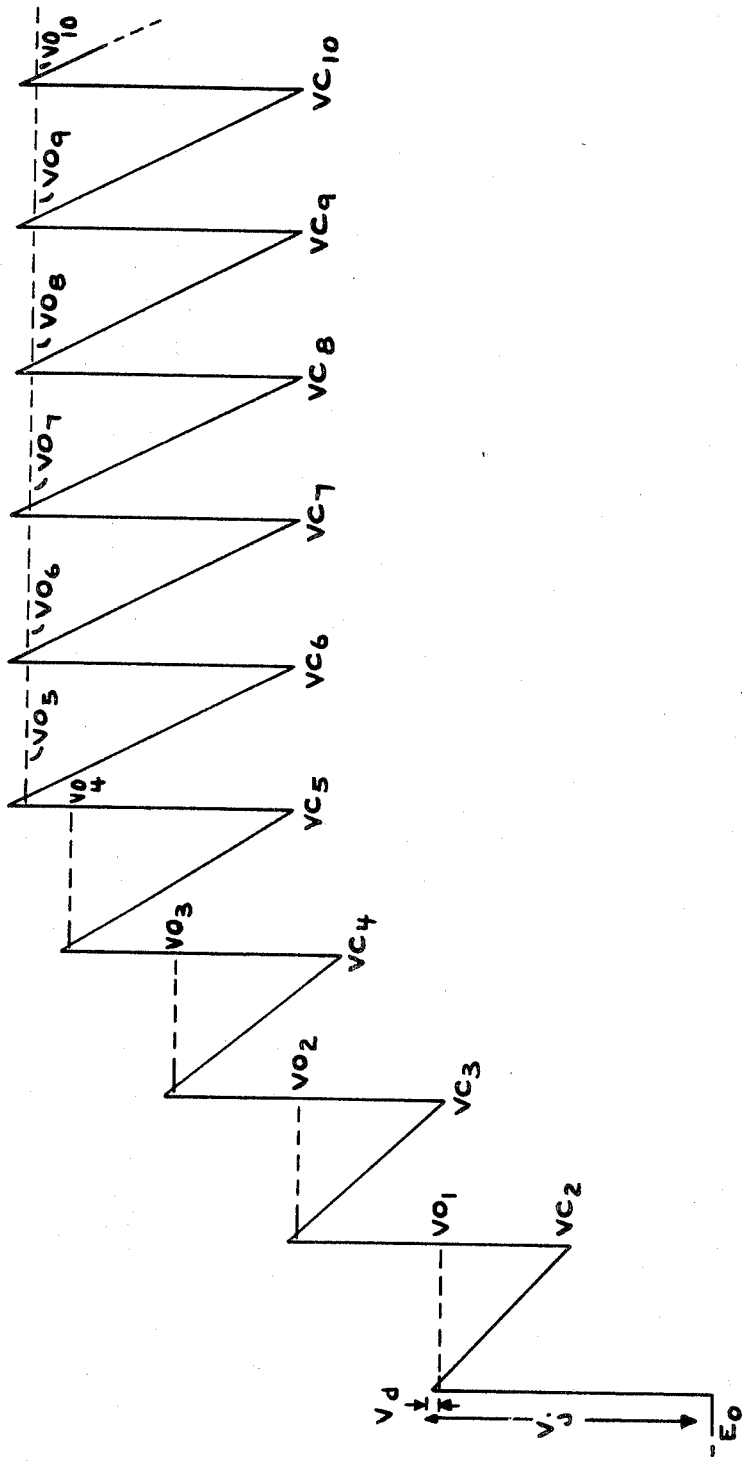
FIG. 2 illustrates graphically the voltage buildup in one stage of the circuit, and the voltage value applied to the readout meter as each successive dial pulse is received.

It can be seen with reference to FIG. 2 that when the voltage at capacitor 22 was increased by $V_j$ volts as the contacts '$a$' were first closed, the voltage on capacitor 25 of peak and hold circuit 12 also went up by essentially the same amount $VO_1$ (neglecting the small drop across diode 21). However, when the voltage on capacitor 22 decreases to a value $VC_2$ by reason of the voltage on capacitor 25 and at point S, the voltage on capacitor 25 remains at the same value $VO_1$ by reason of the very high resistances 30 and 31 and the fact that diode 21 is back biassed at this time.

As the make portion of the second pulse is received, relay R operates to open contact '$b$' and close contact '$a$,' and the charge on capacitor 22 increases from the value $VC_2$ by an amount $V_j$ to a value which, as shown in FIG. 2 is now $VO_2$. It should be observed that the value of capacitor 22 is chosen so that the voltage across it reaches a recurrent value in less than 1 second, and in the illustration of FIG. 2 such condition is reached in approximately 0.4 seconds. Thus, if the initial voltage on capacitor 22 was $E_o$ volts (i.e., before the make pulse was received in a dial test), with each closure of contact 'a' the voltage will increase by the amount $V_j$ and during each break period when contact 'a' is opened the voltage falls off to a new value such as $VC_2$, $VC_3$, etc., (FIG. 2). The same process takes place as each successive incoming pulse is received, and the voltage at capacitor 22 continues to build up to higher and higher values $VO_2$—$VO_5$ and to fall off to successively higher values $VC_3$, $VC_4$ and $VC_5$. As shown in FIG. 2, after the fourth pulse is received, the voltage excursion on capacitor 22 is nearly between the same values for the remainder of the pulses in the series.

In like manner the voltage on capacitor 25 keeps on increasing to higher values as the first pulse of the series of ten is received, but unlike capacitor 22, the voltage on capacitor 25 stays substantially at the new increased values $VO_1$, $VO_2$, etc., after the incoming pulse is terminated (i.e., the new value less the total drop (VD) in resistor 26 and transistors 32 and 33). After four pulses the potential on capacitor 25 reaches $VO_5$ and remains at nearly such value for the remainder of the pulse period.

If the dial on the telephone under test has been rotated to transmit digit '0' and the dial is transmitting properly, the output voltage on the meter 41 will build up to $VO_{10}$ volts (FIG. 2) and will remain at the value for a period of time sufficient to permit correct readout of such value (i.e., 20—30 seconds for example). The meter thus provides sufficient time to obtain an accurate indication of the voltage which represents the results of the test.

In one embodiment, transistors 32 and 33 had current gains (8) equal to 30 and 60 respectively. After the receipt of ten pulses by relay R, the output current from transistor 33 to meter 41 is about 500 uA. The meter 41 has a resistance of 20 K ohms so that the meter reading is 10 volts when ten pulses are received whereby the meter provides a direct output reading in terms of the number of pulses per second. The meter 41 can be reset by closing switch 40.

It will be apparent that if a dial under test is slow (i.e., for example only transmits 9 pulses per second) the time period that contacts 'a' are closed will be increased and the period of discharge of capacitor 8 will be longer. As a result the value of $VC_2$ will be smaller than in the case of the dial performance illustrated in FIG. 2, the value of voltage $VO_5$—$VO_{10}$ on capacitor 25 will be correspondingly less and the reading on the meter 41 will be correspondingly lower.

By way of brief example, in the case of a dial which provides 10 pps, the value of $V_j$ may be in the order of 3 volts and the values of $VO_5$—$VO_{10}$ will be ten volts, and $VC_5$, $VC_6$, etc., may be in the order of seven volts. If, now, a dial having a speed of 9 pps is tested, the value of $VO_5$—$VO_{10}$ will be 9 volts and $VC_5$, $VC_6$ will be in the order of 6 volts. If a dial having a speed of approximately 11 pps is tested, the period of closure of contact $a$ for each of the ten pulses is correspondingly shorter and the voltage on capacitor 22 will not decrease as much during the receipt of the successive pulses. As a result the value of $VO_5$—$VO_{10}$ will be 11 volts and the value of $VC_5$—$VC_{10}$ may be in the order of 8 volts.

It will be apparent from the foregoing description that a change in the speed of the dial under test will vary the time of closure of the contacts and thereby the time of discharge of capacitor 22 which in conjunction with capacitor 25 provides correspondingly different output voltages to meter $E_o$, which voltage persists for a period of time which permits ready readout of the information on the meter.

For purposes of a more complete disclosure, it will be assumed that when contact 'a' closes, the currents in leads 10A, 22A, and 12A are $I_1$, $I_2$ and $I_3$ respectively. The flow of discharge current $II_1$ through lead 22A, resistor 10, lead 10A, produces a peak output current which charges capacitor 22 through resistor 18, and capacitor 25 through resistor 18 and diode 21. The charging current ($I_4$) flowing through the capacitor 22 $=I_2-I_3$. When contact 'a' opens, and it starts discharging, the same amount of reverse current flows through capacitor 22. Since average current flowing through capacitor 22 is zero ($\bar{I}_2-\bar{I}_4=0$) we have $\bar{I}_1=\bar{I}_2=\bar{I}_3$, wherein the bar symbol indicates average value. Now, $\bar{I}_1=V_1C_1f$ where $V_1$ is the voltage to which capacitor 8 (capacitance $=C_1$) was charged. Also if $V_o$ is the output voltage (voltage at point S) then $\bar{I}_2=V_o/R_2$ where $R_2$ is the effective resistance of resistors 24 and 28a. Since $\bar{I}_1=\bar{I}_2$, we have $V_o/R_2=V_1C_1f$ or $V_o=V_1R_2C_1f$.

To establish a one to one correspondence between the output voltage and the frequency of incoming pulses, the produce $V_1R_2C_1$ is made equal to unity thereby giving $V_o=f$. In a working unit the following values were chosen: $V_1=9.5$ volts, $C_1=0.56$ uf, $R_2=118k\Omega$ resulting in $V_1C_1R_2=1$.

As long as capacitor 8 can charge and discharge during the interval when a dial pulse is absent and present respectively, the make-break ratio and the contact bounce of the dialing relay will have no effect upon the meter reading.

A typical list of component values for practicing the invention is as follows:
Resistor 39=820 ohms
Resistor 11=1.5 K ohms
Resistor 10=1.5 K ohms
Resistor 13=68 K ohms
Resister 18=100 ohms
Resistor 26=1.5 K ohms
Resistor 30, 31=1 meg ohms each
Resistor 34=1.5 K ohms
Resistor 24=91 K ohms
Resistor 28=50 K ohms
Zener diode 38 = type IN4160B, 8.2 volts
Zener diode 35 = type IN4170B, 22 volts
Capacitor 8= 1 $u$ farads
Capacitor 22=2 $u$ farads
Capacitor 25 =4 $u$ farads
Transistor 32 =Type 2N2483
Transistor 33 =Type 2N2484

I claim:

1. A frequency measuring circuit comprising input means over which a series of pulses having make and break periods are received at a variable frequency, an operational amplifier circuit having a first and a second input circuit, a first capacitor, a charging circuit for charging said capacitor to a predetermined voltage during one of the periods of each of said pulses, means connecting said one input circuit of said operational amplifier to a reference source, a feedback circuit connected from the output of said operational amplifier to said second input circuit including one branch having a second capacitor and a parallel branch including a peak sample and hold circuit, switch means for connecting said first capacitor to a discharge circuit including at least one of said feedback circuit branches during the other period of each of said incoming pulses, and readout means connected to said peak and hold circuit for providing a readout of the output voltage of said peak and hold circuit, which voltage varies with the frequency of said pulses.

2. A frequency measuring circuit as set forth in claim 1 in which said peak and hold circuit includes a further storage capacitor which is connected to the output of said operational amplifier, and which is charged to the peak value of the potential which occurs on said second capacitor with the receipt of each pulse over said input means.

3. A frequency measuring circuit as set forth in claim 2 in which the potential on said further capacitor in said peak and hold circuit effects current flow over said second capacitor and partial discharge thereof during the period in which no pulse is received over said input means.

4. A frequency measuring circuit as set forth in claim 3 in which the charge on said further capacitor reaches a steady recurrent value which represents the pulse frequency prior to receipt of a full series of said pulses.

5. A frequency measuring circuit as set forth in claim 1 which includes a diode connected between a source of potential and said feedback circuit to normally provide a slight positive bias to said operational amplifier.

6. A frequency measuring circuit comprising input means over which pulses having make and break periods are received at a frequency to be measured, an operational amplifier circuit having a first and a second input circuit, means connecting said one input circuit of said operational amplifier to a reference source, a first capacitor, a charging circuit for charging said first capacitor to a predetermined voltage, and switching means for connecting said first capacitor to said charging circuit during each of said break periods and for connecting said first capacitor to a discharge circuit and the second one of said input circuits during each make period of said pulses, said discharge circuit including a second capacitor connected from said output circuit to said second input of said operational amplifier, a peak sample and hold circuit connected to the output circuit of said operational amplifier which holds a steady output voltage proportional to the operational amplifier peak output voltage, and a feedback resistance connected from the peak sample and hold circuit to said second input of the operational amplifier, whereby the steady feedback current equals the average input current over said first capacitor, and the instantaneous current over the second capacitor equals the difference between the instantaneous and average current flowing in the discharge path of the first capacitor.

7. A measuring circuit according to claim 6 wherein the proportionality between the output voltage of said peak sample and hold circuit and said frequency is a one to one correspondence.

8. A frequency measuring circuit as set forth in claim 6 in which said peak sample and hold circuit includes a further capacitor for accumulating a charge proportional to the peak output voltage of the operational amplifier as each further pulse is received, and in which the charge on said further capacitor is effective over said feedback resistance to decrease the charge on the second capacitor during each break period of said pulses.

9. A frequency measuring circuit as set forth in claim 8 which includes a diode connected between said second capacitor and said further capacitor which is back-biased to prevent discharge of said further capacitor with changes in the voltage on said second capacitor.

10. A frequency measuring circuit comprising input means over which pulses are received at a variable frequency, an operational amplifier circuit having a first and a second input circuit, a first capacitor, a charging circuit for charging said capacitor to a predetermined voltage during the periods between receipt of each of said pulses, means connecting said one input circuit of said operational amplifier to a reference source, and switching means for connecting said first capacitor to said charging circuit during the absence of a pulse and for connecting said first capacitor to the second one of said input circuits during the period of receipt of each pulse over said input means, a second capacitor connected from the output of said operational amplifier to said second input circuit, said operational amplifier effecting increase of the charge on said second capacitor by an amount $V_j$ with each connection of said first capacitor to said second input circuit and said second capacitor, a peak sample and hold circuit connected to the output of said operational amplifier having a third capacitor which holds a steady output voltage proportional to the peak voltage output on said second capacitor as successive pulses are received, means connecting the output of said peak sample and hold circuit to said second input circuit and said second capacitor, said voltage on said third capacitor being effective to partially discharge said second capacitor during the periods between successive pulses, and readout means connected to the output of said peak sample and hold circuit for providing a readout of the output voltage of said peak and hold circuit as an indication of the frequency of said pulses.

11. A frequency measuring device as set forth in claim 10 in which said voltage on said capacitor has a one to one relation with the number of pulses in a series to permit direct readout of said voltage as pulses per second on said meter.

12. A frequency measuring circuit comprising input means over which a series of pulses are received at a variable frequency, an operational amplifier circuit, a first potential storage means charged to a predetermined voltage during one period of each pulse, a feedback circuit connected between the output of said operational amplifier and one input of said operational amplifier including a second potential storage means, switching means operative during a different period of each pulse to establish a discharge circuit for said first potential storage means which includes said second potential storage means in said feedback circuit, and a peak sample and hold circuit connected to said second potential storage means for providing a steady output voltage proportional to the peak voltage which builds up on said second potential storage means as a series of pulses is received, the peak voltage being different for different pulse frequencies, and readout means connected to said peak and hold circuit for providing a readout of the output voltage of said peak and hold circuit as an indication of the frequency of said pulses.